(12) United States Patent
Mossberg

(10) Patent No.: US 7,062,128 B2
(45) Date of Patent: Jun. 13, 2006

(54) HOLOGRAPHIC SPECTRAL FILTER

(75) Inventor: Thomas W. Mossberg, Eugene, OR (US)

(73) Assignee: Lightsmyth Technologies INC, Eugene, OR (US)

( * ) Notice: Subject to any disclaimer, the term of this patent is extended or adjusted under 35 U.S.C. 154(b) by 97 days.

(21) Appl. No.: 11/076,251

(22) Filed: Mar. 8, 2005

(65) Prior Publication Data

US 2005/0152011 A1 Jul. 14, 2005

Related U.S. Application Data

(62) Division of application No. 09/811,081, filed on Mar. 16, 2001, now Pat. No. 6,879,441.

(60) Provisional application No. 60/190,126, filed on Mar. 16, 2000, provisional application No. 60/199,790, filed on Apr. 26, 2000, provisional application No. 60/235,330, filed on Sep. 26, 2000, provisional application No. 60/247,231, filed on Nov. 10, 2000.

(51) Int. Cl.
*G02B 6/34* (2006.01)
*G03H 1/10* (2006.01)
*H04J 14/02* (2006.01)

(52) U.S. Cl. .............. 385/37; 385/3; 385/14; 385/129; 385/130; 385/132; 359/10; 359/15; 359/34; 398/79; 398/84; 398/87

(58) Field of Classification Search ............. 385/1–3, 385/14, 37, 129, 130, 131, 132; 359/10, 359/15, 34; 398/79, 84, 87
See application file for complete search history.

(56) References Cited

U.S. PATENT DOCUMENTS

| | | | |
|---|---|---|---|
| 4,140,362 A | 2/1979 | Tien | 350/362 R |
| 4,387,955 A | 6/1983 | Ludman et al. | 385/37 X |
| 4,440,468 A | 4/1984 | Auracher et al. | 385/37 X |
| 4,660,934 A | 4/1987 | Akiba et al. | 350/320 |
| 4,740,951 A | 4/1988 | Lizet et al. | 385/37 X |
| 4,743,083 A | 5/1988 | Schimpe | 385/37 |
| 4,746,186 A | 5/1988 | Nicia | 385/129 X |
| 4,773,063 A | 9/1988 | Hunsperger et al. | 385/129 X |
| 4,786,133 A | 11/1988 | Gidon et al. | 385/37 X |

(Continued)

FOREIGN PATENT DOCUMENTS

EP 0 310 438 A1 4/1989 ............ 385/37 X (Continued)

OTHER PUBLICATIONS

Capron et al, J. Lightwave Tech., vol. 11 No. 12 pp 2009-2014 (Dec. 1993).

(Continued)

*Primary Examiner*—Brian M. Healy
(74) *Attorney, Agent, or Firm*—David S Alavi

(57) ABSTRACT

Method and apparatus are contemplated for receiving from an input, an optical signal in a volume hologram comprising a transfer function that may comprise temporal or spectral information, and spatial transformation information; diffracting the optical signal; and transmitting the diffracted optical signal to an output. A plurality of inputs and outputs may be coupled to the volume hologram. The transformation may be a linear superposition of transforms, with each transform acting on an input signal or on a component of an input signal. Each transform may act to focus one or more input signals to one or more output ports. A volume hologram may be made by various techniques, and from various materials. A transform function may be calculated by simulating the collision of a design input signal with a design output signal.

60 Claims, 13 Drawing Sheets

U.S. PATENT DOCUMENTS

| | | | | |
|---|---|---|---|---|
| 4,824,193 | A | 4/1989 | Maeda et al. | 385/37 X |
| 4,834,474 | A | 5/1989 | George et al. | 372/25 X |
| 4,846,552 | A | 7/1989 | Veldkamp et al. | 385/162.2 |
| 4,923,271 | A | 5/1990 | Henry et al. | 385/37 X |
| 4,938,553 | A | 7/1990 | Maerz et al. | 385/37 X |
| 5,040,864 | A * | 8/1991 | Hong | 385/16 |
| 5,107,359 | A | 4/1992 | Ohuchida | 385/37 X |
| 5,165,104 | A | 11/1992 | Weverka | 385/7 |
| 5,195,161 | A | 3/1993 | Adar et al. | 385/129 |
| 5,357,591 | A | 10/1994 | Jiang et al. | 385/37 |
| 5,450,511 | A | 9/1995 | Dragone | 385/37 X |
| 5,768,450 | A | 6/1998 | Bhagavatula | 385/24 |
| 5,812,318 | A | 9/1998 | Babbitt et al. | 359/559 |
| 5,830,622 | A | 11/1998 | Canning et al. | 430/321 |
| 6,011,884 | A | 1/2000 | Dueck et al. | 385/37 X |
| 6,011,885 | A | 1/2000 | Dempewolf et al. | 385/34 |
| 6,137,933 | A | 10/2000 | Hunter et al. | 385/37 |
| 6,169,613 | B1 | 1/2001 | Amitai et al. | 359/15 |
| 6,169,614 | B1 * | 1/2001 | Whitcomb et al. | 359/15 |
| 6,678,429 | B1 * | 1/2004 | Mossberg et al. | 385/10 |

FOREIGN PATENT DOCUMENTS

| | | | | |
|---|---|---|---|---|
| GB | 2 168 215 A | 6/1986 | | 385/37 X |
| WO | WO-99/35523 A1 | 7/1999 | | 385/37 X |
| WO | WO-99/56159 A1 | 11/1999 | | 385/37 X |

OTHER PUBLICATIONS

Deri et al, IEEE Photonics Tech. Lett., vol. 6 No. 2 pp 242-244 (Feb. 1994).

Grunnet-Jepsen et al, Electron. Lett., vol. 35 No. 13 pp1096-1097 (Jun. 1999).

Paddon et al, Opt. Lett., vol. 23 No 19 pp 1529-1531 (1998).

Madsen et al, IEEE J. Sel. Top. Quant. Elec., vol. 4 No. 6 pp 925-929 (Nov./Dec. 1998).

Gini et al, J. Lightwave Tech., vol. 16 No. 4 pp 625-630 (Apr. 1998).

Day et al, J. Lightwave Tech., vol. 14 No. 8 pp 1815-1824 (Aug. 1996).

McGreer, IEEE Photonics Tech. Lett., vol. 7 No. 3 pp 324-326 (Mar. 1995).

Takenouchi et al, Optics Express, vol. 6 No. 6 pp 124-135 (Mar. 2000).

Grunnett-Jepsen et al, Photonics Tech. Lett., vol. 11 No. 10 (Oct. 1999).

Babbitt et al, Opt. Commun., vol. 148 pp 23-26 (1998).

Brigham et al, Analysis of scattering from large planar gratings of compliant ctlindrical shells, J. Acoust. Soc. Am., vol. 61 No. 1 pp 48-59 (Jan. 1977).

Kurokawa et al, Electron. Lett., vol. 33 No. 22 pp 1890-1891 (Oct. 1997).

Sudbo et al, J. Lightwave Tech., vol. 8 No. 6 pp 998-1006 (Jun. 1990).

Henry, J. Lightwave Tech., vol. 8 No. 5 pp 748-755 (May 1990).

Koontz et al, Appl. Phys. Lett., vol. 71 No. 10 pp 1400-1402 (Sep. 1997).

Song et al, Appl. Opt., vol. 34 No. 26 pp 5913-5919 (Sep. 1995).

Brazas et al, Appl. Opt., vol. 34 No. 19 pp 3786-3792 (Jul. 1995).

Bates et al, Appl. Opt., vol. 32 No. 12 pp 2112-2116 (Apr. 1993).

Wang et al, Appl. Opt., vol. 32 No. 14 pp 2606-2613 (May 1993).

Magnusson et al, Appl. Phys. Lett., vol. 61 No. 9 pp 1022-1024 (Aug. 1992).

Ojha et al, Demonstration of low loss integrated InGaAsP/InP. demultiplexer device with low polarisation sensitivity, Electron. Lett., vol. 29 No. 9 (Apr. 1993).

Li, Opt. Commum., vol. 114 pp 406-412 (1995).

Soole et al, Electron. Lett., vol. 31 No. 15 pp 1276-1277 (Jul. 1995).

Rantala et al, Electron. Lett. vol. 34 No. 5 pp 455-456 (Mar. 1998).

Cowin et al Electron. Lett., vol. 35 No. 13 pp 1074-1076 (Jun. 1999).

Canning et al, Opt. Commun., vol. 171 pp 213-217 (1999).

Tien et al, Use of concentric-arc grating as a thin-film spectrograph for guided waves, Am. Inst. of Physics (1980) pp 524-525.

Kaneko et al, IEEE J. Sel. Top. Quant. Elec., vol. 5 No. 5 pp 1227-1236 (Sep./Oct. 1999).

Sun et al, IEEE Photonics Tech. Lett., vol. 10 No. 1 pp 90-92 (Jan. 1998).

McGreer, IEEE Photonics Tech. Lett., vol. 8 No. 4 pp 551-553 (Apr. 1996).

Avrutsky et al, IEEE Photonics Tech. Lett., vol. 10 No. 6 pp 839-841 (Jun. 1998).

Alavie et al, IEEE Photonics Tech. Lett., vol. 5 No. 9 pp1112-1114 (Sep. 1993).

Fu et al, Opt. Lett., vol. 22 No. 21 pp 1627-1629 (1997).

Wang et al, IEEE Photonics Tech. Lett., vol. 3 No. 1 pp 36-38 (Jan. 1991).

Wang et al Opt. Lett., vol. 15 No. 7 pp 63-365 (Apr. 1990).

Wu et al, J. Lightwave Tech., vol. 10 No. 11 pp 1575-1589 (Nov. 1992).

Eldada et al, IEEE Photonics Tech. Lett., vol. 12 No. 7 pp 819-821 (Jul. 2000).

Chen et al, J. Lightwave Tech., vol. 10 No. 7 pp 888-897 (Jul. 1992).

Minier et al, Diffraction characateristics of superimposed holographic gratings in planar optical waveguides, IEEE Photonics Tech. Lett., vol. 4 No. 10 (Oct. 1992).

Miya, IEEE J. Sel. Top. Quant. Elec., vol. 6 No. 1 pp 38-45 (Jan./Feb. 2000).

Backlund et al, IEEE Photonics Tech. Lett., vol. 12 No. 3 pp 314-316 (Mar. 2000).

Wiesman et al, IEEE Photonics Tech. Lett., vol. 12 No. 6 pp 639-641 (Jun. 2000).

Ura et al, Integrated optical wavelength demultiplexer using a coplanar grating lens, Appl. Opt., vol. 29 No. 9 pp 1369-1373 (Mar. 1990).

Chen et al, Ten channel single-mode wavelength division demultiplexer in the near IR, Integrated Optical Circuits, vol. 1583 pp 134-142 (Intl. Soc. Opt. Eng., Boston, MA, USA, Sep. 1991).

Babbitt et al, Opt. Lett., vol. 20 No. 8 pp 910-912 (Apr. 1995).

Mossberg, Opt. Lett., vol. 26 No. 7 pp 414-416 (Apr. 2001).

Tang et al, A novel wavelength-division-demultiplexer with optical in-plane to surface-normal conversion, IEEE Photonics Tech. Lett., vol. 7 No. 8 (Aug. 1995).

Brady et al, Applied Optics, vol. 30 No. 17 p. 2324 (Jun. 1991).

Preston, "Digital holographic logic", Pattern Recognition, vol. 5, p. 37 (1973).

* cited by examiner

HOLOGRAPHIC SPECTRAL FILTER

BENEFIT CLAIMS TO RELATED APPLICATIONS

This application is a divisional application of prior-filed non-provisional application Ser. No. 09/811,081 entitled "Holographic spectral filter" filed Mar. 16, 2001 in the name of Thomas W. Mossberg, (now U.S. Pat. No. 6,879,441), said non-provisional application in turn claiming benefit of: 1) provisional App. No. 60/190,126 filed Mar. 16, 2000; 2) provisional App. No. 60/199,790 filed Apr. 26, 2000; 3) provisional App. No. 60/235,330 filed Sept. 26, 2000; and 4) provisional App. No. 60/247,231 filed Nov. 10, 2000. Said non-provisional application and each of said provisional applications are hereby incorporated by reference as if fully set forth herein.

BACKGROUND

The field of interest is optical signal processing.

This application is related to non-provisional application Ser. No. 10/602,327 filed Jun. 23, 2003 (now U.S. Pat. No. 6,859,318 issued Feb. 22, 2005). Said application and said patent are hereby incorporated by reference as if fully set forth herein.

Spectral filtering is a very useful optical function that can be utilized to control the temporal waveform of pulsed optical signals, cross-correlate or otherwise process optical signals, and to differentially control and manipulate spectrally-distinguished optical communication channels, as found for example in wave-division-multiplexed (WDM) optical communication systems. Devices have been introduced over the years to perform spectral filtering, all of which have characteristic shortcomings along with their strengths. In many cases these shortcomings, including limited spectral resolution, alignment sensitivity, fabrication difficulties, high cost, and lack of flexibility, have prevented widespread application.

A spectral filtering device, according to the present usage, is a device that applies a fixed or dynamically re-programmable, complex-valued, spectral transfer function to an input signal. If $E_{in}(\omega)$ and $E_{out}(\omega)$, respectively, represent Fourier spectra of input and output signals, computed on the basis of the time-varying electric fields of the two signals, and $T(\omega)$ is a complex-valued spectral transfer function of modulus unity or smaller, the effect of the spectral filtering device (also called an optical processing device, OPD) can be represented as $$E_{out}(\omega) = T(\omega) E_{in}(\omega) \quad (1)$$

The transfer function $T(\omega)$ has an overall width $\Delta_\omega$ and a resolution width $\Delta_r$, where the latter quantity is the minimum spectral interval over which $T(\omega)$ displays variation (see FIG. 1), and is a significant measure of the transformation ability of a spectral filtering device. The physical characteristics of a particular spectral filtering device determine the range and types of spectral transfer functions that it can be configured to provide. We limit our discussion here to spectral filtering devices that act to apply a fully coherent transfer function, i.e. the device fully controls the amplitude and phase shifts applied to the input signal spectrum, except for an overall phase factor.

Spectral filtering devices can be utilized to transform input signals from one format into another, or to tailor their spectra to some preferred form. A spectral filtering device, according to the present usage, may or may not have the additional capacity to transform the spatial wavefront of input optical signals.

As a special case, if $T(\omega)$ is set equal to the conjugate Fourier spectrum $E_{ref}^*(\omega)$ of a reference temporal waveform, also called the design temporal waveform, the output field from the spectral filtering device is proportional to the cross-correlation of the input field with the reference temporal waveform. Temporal cross-correlation capability is widely useful in temporal pattern recognition.

The capabilities of a spectral filtering device can be utilized in multiple ways in communications systems, including signal coding and decoding for Code-Division Multiplexing (CDM), optical packet recognition, code-based contention resolution, as WDM multiplexers and demultiplexers, and as WDM add/drop multiplexers. FIG. 2 depicts the encoding and decoding of optical signals in a CDM context. Data 202 is input through a first communication channel, and data 206 is input through a second communication channel. Data 202 passes through a spectral filter 204, which encodes data 202 with an identifying code. Similarly, data 206 is encoded with an identifying code by a spectral filter 208. The encoded signals are combined and transmitted over an optical transmission line 210. At their destination the encoded signals are split into two paths, 212 and 214. The upper path 212 feeds into a spectral filter 216, which imparts a transfer function that is the conjugate transfer function of the filter 204. The output of spectral filter 216 is a signal comprising the superposition of data 202 and data 206; however, due to the encoding imparted by spectral filters 204 and 208 and subsequent decoding by spectral filter 216, this output signal contains a component 218 originating from 202 that has a specific recognizable temporal waveform, typically comprising a brief high power peak for each bit transmitted, along with a component 220 originating from data 206. In the upper path, the component originating from data 206 has a temporal waveform structure that can be discriminated against in detection. Typically, component 220 has no brief high power peak.

In similar fashion, the lower branch 214 feeds into a spectral filter 222, the output of which is a signal made up of the superposition of a component 224 originating from data 206, and a component 226 originating from signal 202. As before, the two signal components have distinguishable temporal waveforms, with the component from data 206 typically having a brief detectable high power peak while the component from data 202 lacking the brief high power peak, and hence remaining below a detection threshold. A key element in CDM detection is the implementation of thresholding in the detection scheme that can distinguish input pulses of differing temporal waveform character.

A variety of other CDM methods are known and, many of them having need for high performance spectral filtering devices. Some alternative CDM approaches operate entirely with spectral coding. Different applications for high performance spectral filtering devices exist. For example, spectral filtering devices capable of accepting multiple wavelength-distinguished communication channels through a particular input port, and parsing the channels in a predetermined fashion to a set of output ports, i.e., a WDM demultiplexer, have wide application. This is especially true if the spectral filtering device is capable of handling arbitrary spectral channel spacing with flexible and controllable spectral band-pass functions.

A widely known approach to implementing coherent spectral filtering is a dual-grating, free-space optical design, shown schematically in FIG. 3. Gratings 302 and 310 are periodic, with grooves of constant spacing and amplitude. A first grating 302 spectrally disperses an input signal, providing a mapping of frequency-to-position along the x-direction of the filter plane. A lens 304 directs the signal to a planar phase and/or amplitude mask 306, varying in the x-direction, with $\Delta_r$ representing the minimum spectral width over which the mask exhibits variation. A second lens 308 directs the output of the mask 306 to a second grating 310, which accepts the filtered spectral components that have passed through the mask 306, and maps them onto a common output direction.

The dual-grating, free-space spectral filtering device has limited appeal in the context of communication systems because of its physical complexity, sensitivity to precision alignment, relatively large insertion loss, and limited spectral resolution for gratings of tractable physical dimensions. In the dual-grating spectral filter described above, the gratings act only to apply and invert an angle-to-space mapping; no information specific to the transfer function to be imparted resides in the gratings. The mask 306 is necessary to impart the transfer function.

There is another class of spectral filters wherein the entire spectral filtering function is effected through diffraction from a single diffractive structure, having diffractive elements whose diffractive amplitudes, optical spacings, or spatial phases vary along some design spatial dimension of the grating. Diffractive elements correspond, for example, to individual grooves of a diffraction grating, or individual periods of refractive index variation in a volume index grating. Diffractive amplitude refers to the amplitude of the diffracted signal produced by a particular diffraction element, and may be controlled by groove depth, magnitude of refractive index variation, magnitude of absorption, or other quantity, depending on the specific type of diffractive elements comprising the diffractive structure under consideration. Optical separation of diffractive elements refers to the optical path difference between diffractive elements. Spatial phase refers to the positioning as a function of optical path length of diffractive elements relative to a periodic reference waveform. The spatial variation of the diffractive elements encodes all aspects of the transfer function to be applied. We refer here to diffractive structures whose diffractive elements (grooves, lines, planes, refractive-index contours, etc.) possess spatial variation representative of a specific spectral transfer function using the term "programmed." Programmed diffractive structures, i.e. those whose diffractive elements possess spatial structure that encodes a desired spectral transfer function, have only been previously disclosed in the case of surface relief gratings, and in fiber gratings whose diffractive elements correspond to lines (or grooves) and constant index planes, respectively. Programmed diffractive structures known in the art do not provide for the implementation of general wavefront transformations simultaneously with general spectral transformations.

Programmed surface gratings and programmed fiber gratings are encumbered with severe functional constraints. A programmed surface-grating filter has a fundamentally low efficiency, and requires alignment sensitive free-space optical elements to function. Programmed fiber-grating filters produce output signals that are difficult to separate from input signals (since they can only co- or counterpropagate), and can only support a single transfer function within a given spectral window.

In 1998, Babbitt and Mossberg [(Opt. Commun. 148, 23 (1998)] introduced a programmed surface-grating filter, either reflective or transmissive, whose diffractive elements (straight grooves) exhibit spatial structure, i.e., variations in diffractive amplitude, optical separation, or spatial phase, in the direction perpendicular to their length. A free-space implementation 400 of this device is schematically represented in FIG. 4. The diffractive elements (grooves) of the programmed surface-grating filter extend uniformly normal to the plane of the figure, while the diffractive amplitude, spatial separation, and/or spatial phase of the diffractive elements varies with position along the x-direction. A programmed surface-grating device can be produced by a variety of fast and economical processes such as by stamping, lithography, or masking processes. However, programmed surface-grating filters have a very serious deficiency in their intrinsically low efficiency. The profile of a programmed surface grating can be thought of as an assemblage of sine gratings, each of which maps one spectral component of the input signal to the output direction. Since the surface diffraction condition constrains only the surface projection of the input and output wavevectors, however, each constitutive sine grating interacts with all spectral components of the input beam, diffracting all but its design component into discarded output directions. As a result, the higher the complexity of the programmed transfer function (and therefore, the more sine components needed to describe it), the lower the efficiency of the programmed surface grating filter.

Fiber Bragg gratings, such as 502 illustrated in FIG. 5, have become an accepted component in optical communications systems. Programmed fiber Bragg gratings have been disclosed, and provide for higher efficiency and easier implementation than programmed surface gratings. Programmed fiber-grating filters are implemented in fiber links in the same manner as ordinary fiber-grating devices, typically using a circulator 504. Programmed fiber Bragg filters are useful, but have significant limitations. A primary drawback is that there is only one input direction 506 and one output direction 508, those directions being antiparallel (transmitted signals are not often employed.) This means that a given programmed fiber-grating filter can be configured to produce only a single transfer function in a specific spectral region. Furthermore, a circulator 504, used to separate input and output signals is costly, and adds complexity to the overall device. Finally, programmed fiber Bragg gratings are time-consuming and labor-intensive to fabricate. The transfer function is typically imparted to the material via varying the material's index of refraction along the length of the fiber. Fabrication typically requires complex masking and high power ultraviolet exposure for extended time periods, or complicated ultraviolet holographic exposure apparatus with long exposure times.

There have been filters disclosed comprising systems of uniform diffractive elements, that offer the capability of applying a specific type of spatial wavefront transformation to input signals, but that do not possess the capability of implementing general spatial or spectral transformations. Spatial wavefront transformation capability enhances the capability of the device to accept signals from input ports and map them to output ports, without the aid of auxiliary devices to effect needed spatial wavefront transformations.

There remains a need in the art for spectral filtering devices that offer all of the following features: low cost fabrication, low insertion loss (high efficiency), fully integrated design with no free-space optics, general spatial wavefront transformation capability, general spectral transformation capability, and multiport operation with capability of distinct spectral/temporal and spatial transfer functions connecting operative port pairs.

SUMMARY

Method and apparatus are disclosed for receiving from an input an optical signal in a volume hologram comprising a plurality of diffractive elements comprising temporal and/or spectral transformation information and may also comprise spatial transformation information; diffracting the optical signal via the diffractive elements producing a diffracted optical signal; and producing an output comprising the diffracted optical signal.

DETAILED DESCRIPTION OF EMBODIMENTS

The present invention contemplates a new class of spectral filtering devices, which we refer to as programmed holographic spectral filtering devices, or more simply and interchangeably as programmed holographic devices or programmed holographic processors. These spectral filtering devices are free of the shortfalls of previous spectral filtering devices, and yet provide low cost, high performance functionality. Programmed holographic devices comprise volume holograms in substrates that may comprise planar waveguides, bulk materials, or other substrates, whose diffractive elements have spatial variations in amplitude, optical spacing, or spatial phase, whose detailed form dictates the transfer function produced by the device. A volume hologram is a diffractive structure operative to generate output optical signals in response to input optical signals, wherein each portion of the wavefront of the input signal contributes to the output signal by scattering from the diffractive structure as it propagates through the structure over a distance large enough so that retardation effects within the diffractive structure significantly influence the form of the output signal. A volume hologram contrasts with a surface or thin hologram as follows: for a volume hologram, each portion of the input signal wavefront contributes to the output signal due to scattering by a diffractive structure distributed on and within a volume; for a surface or thin hologram, each portion of the input signal wavefront contributes to the output signal only by scattering from a thin layer of diffractive structure.

Filtering devices after the present invention provide for the control and modification of temporal, spectral, and spatial properties of input optical signals. The present invention comprises a spectral filtering device whose advantages include:

high efficiency, even when high-complexity transfer functions are required;

ability to impart general spectral transfer functions;

multiple input and output ports which are spatially separate from one another, thus eliminating the need for costly ancillary components such as circulators;

fast and economical fabrication through stamping, lithographic, or masking processes operative on an external surface;

ability to accept input signals with general planar or curved spatial wavefronts and transform them upon diffraction to other general planar or curved spatial wavefronts so as to match needed input and output wavefront parameters and eliminate separate wavefront conditioning components; and capability for providing multiple spectral/temporal transfer functions in a single device.

Figures 1, 2:
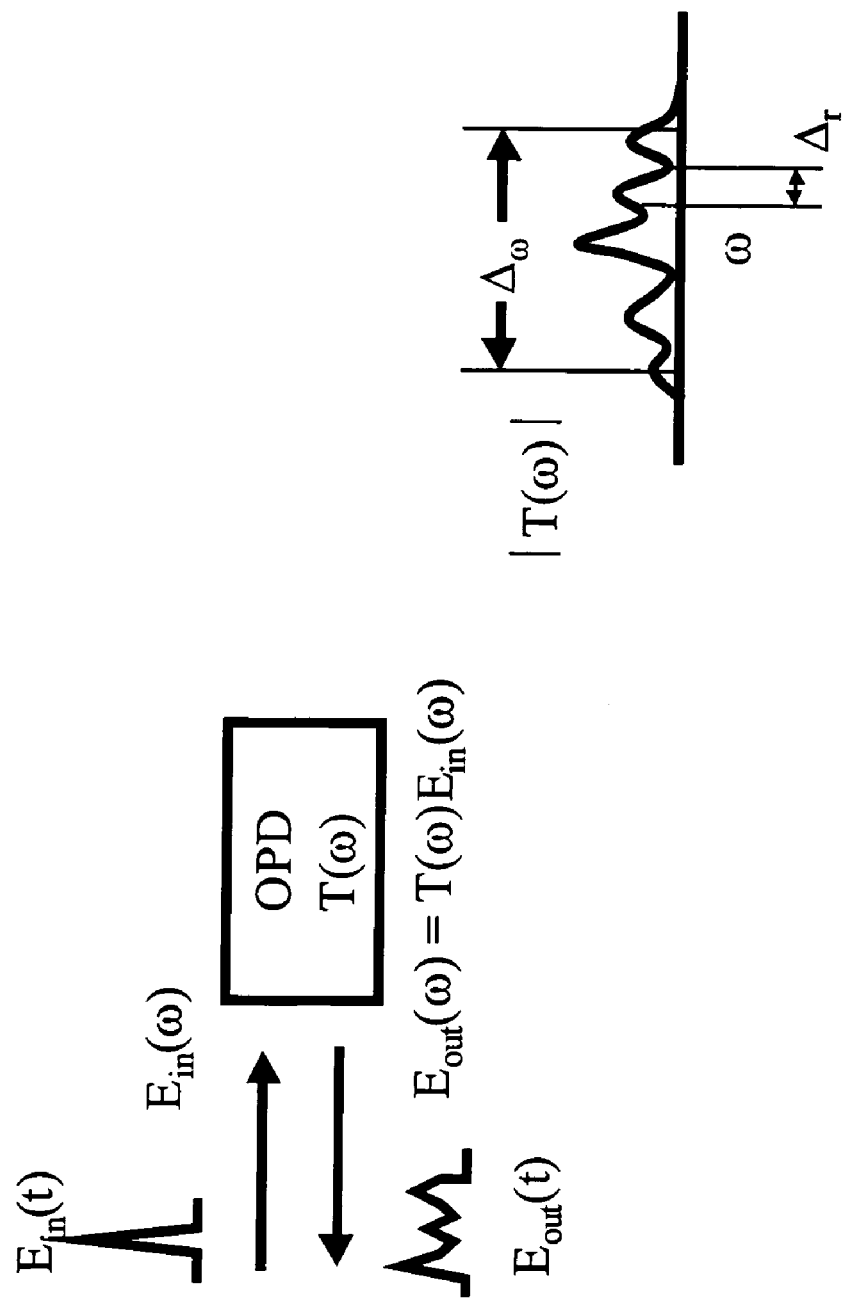
FIG. 1 (prior art) shows an input signal $E_{in}(t)$ accepted by a spectral filtering device comprising a transfer function $T(\omega)$, and a processed output signal $E_{out}(t)$.
FIG. 2 (prior art) shows data input from two sources, applying a spectral filter to each input, transmission and subsequent decoding.
Figure 2:
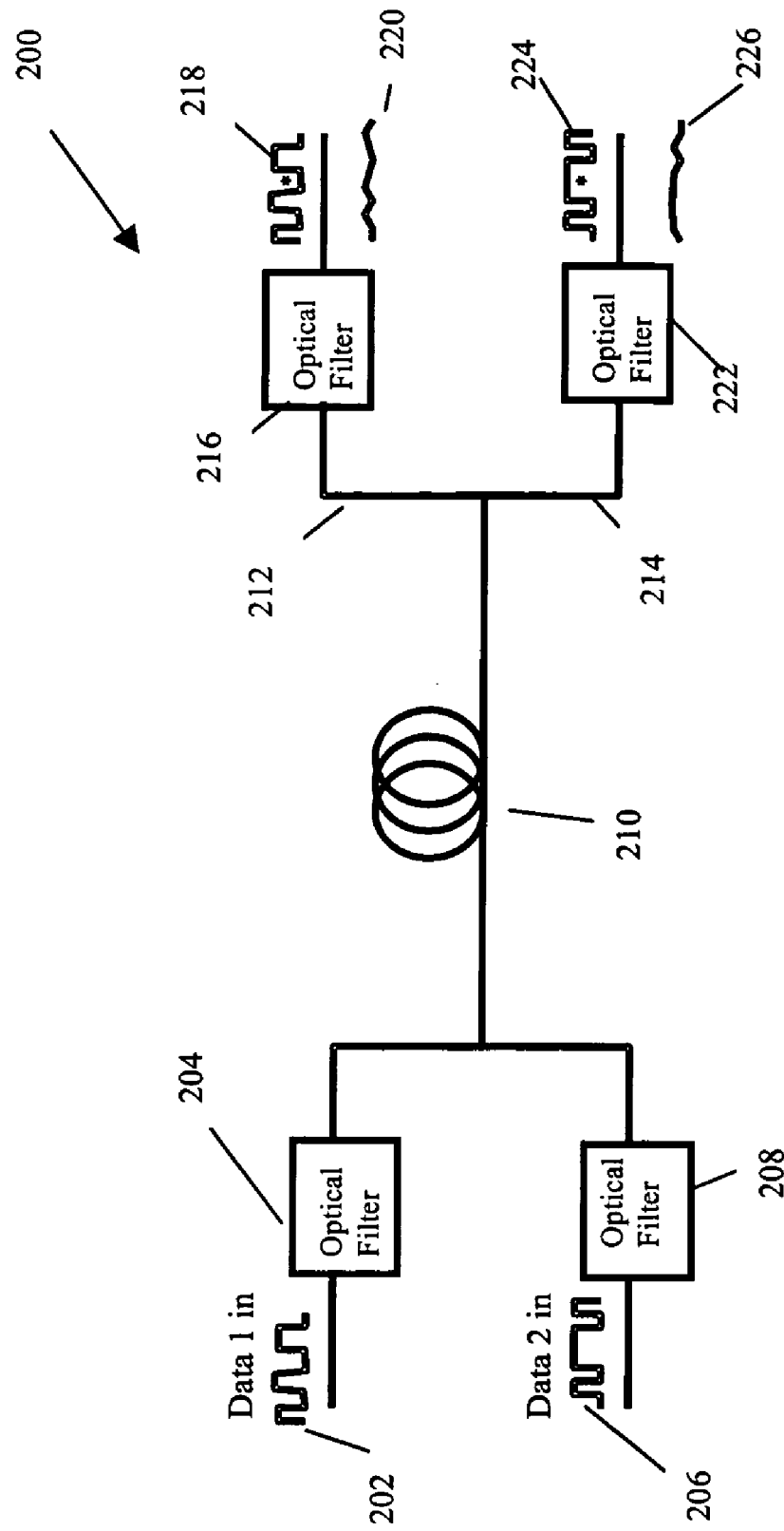
Figure 3:
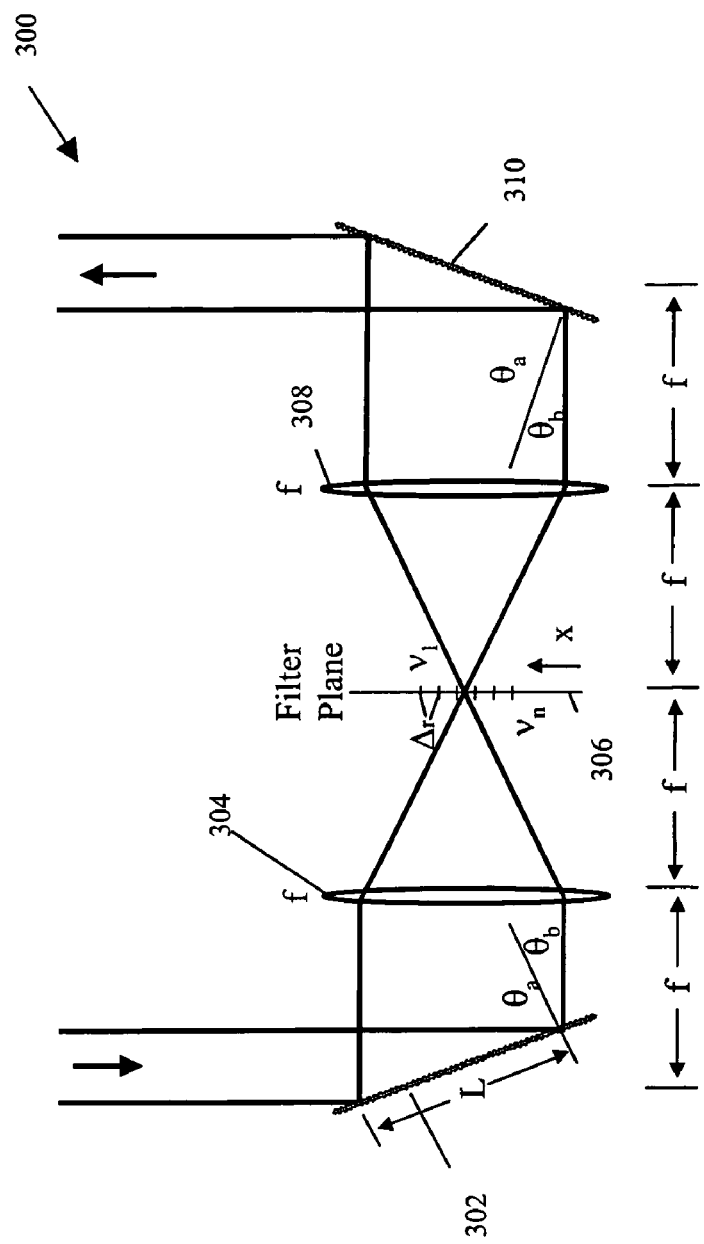
FIG. 3 (prior art) shows a dual-grating, free-space spectral filter design.
Figure 4:
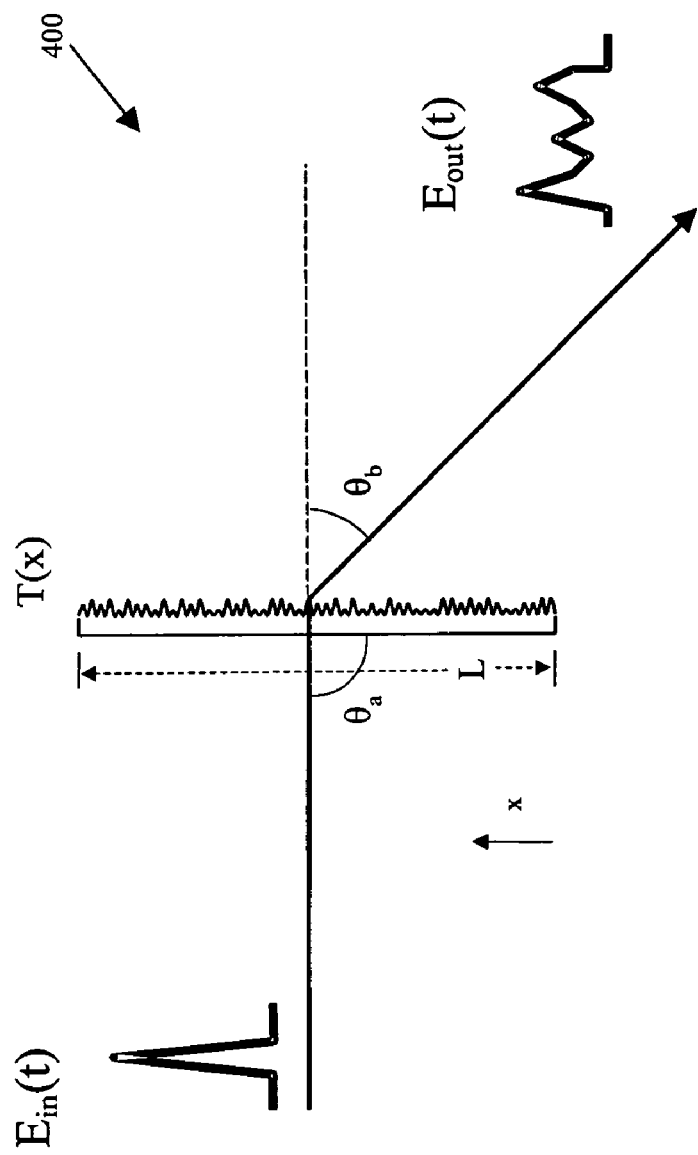
FIG. 4 (prior art) shows a programmed surface-grating spectral filtering device.
Figure 5:
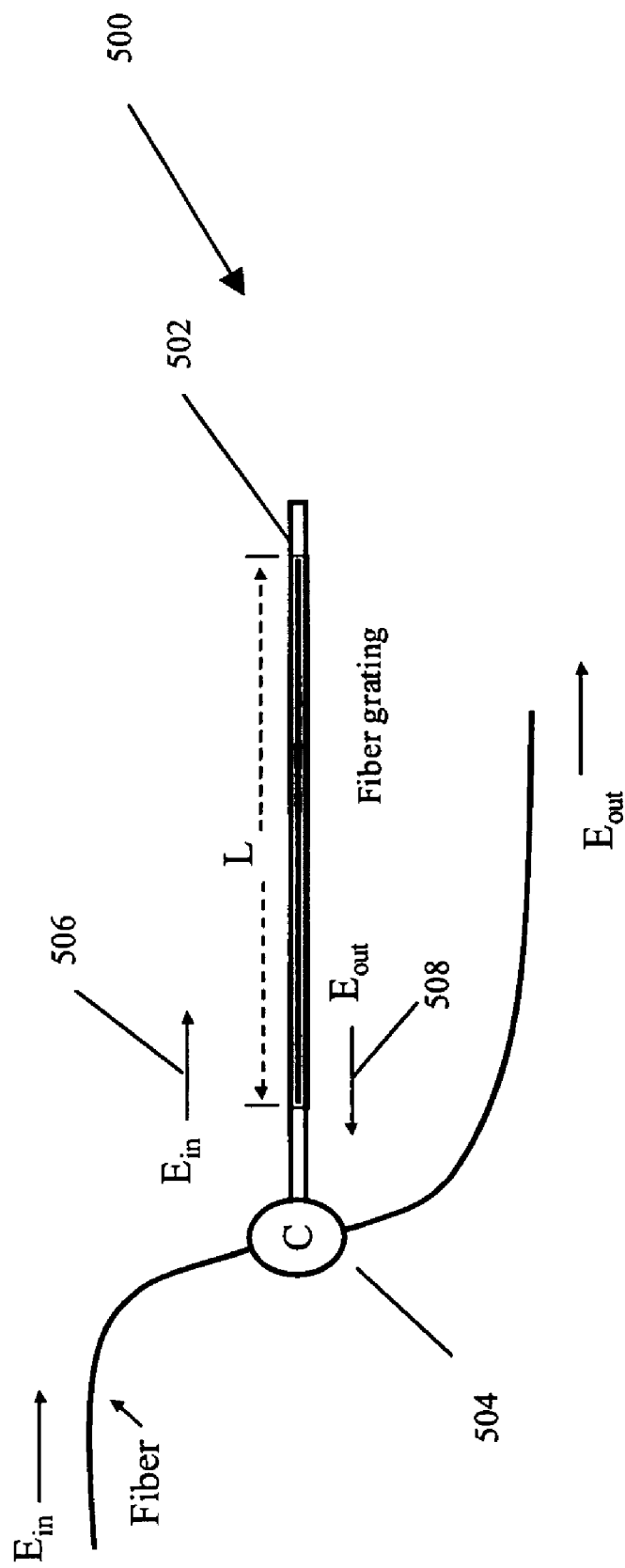
FIG. 5 (prior art) shows a programmed fiber-Bragg grating spectral filtering device.
Figure 6:
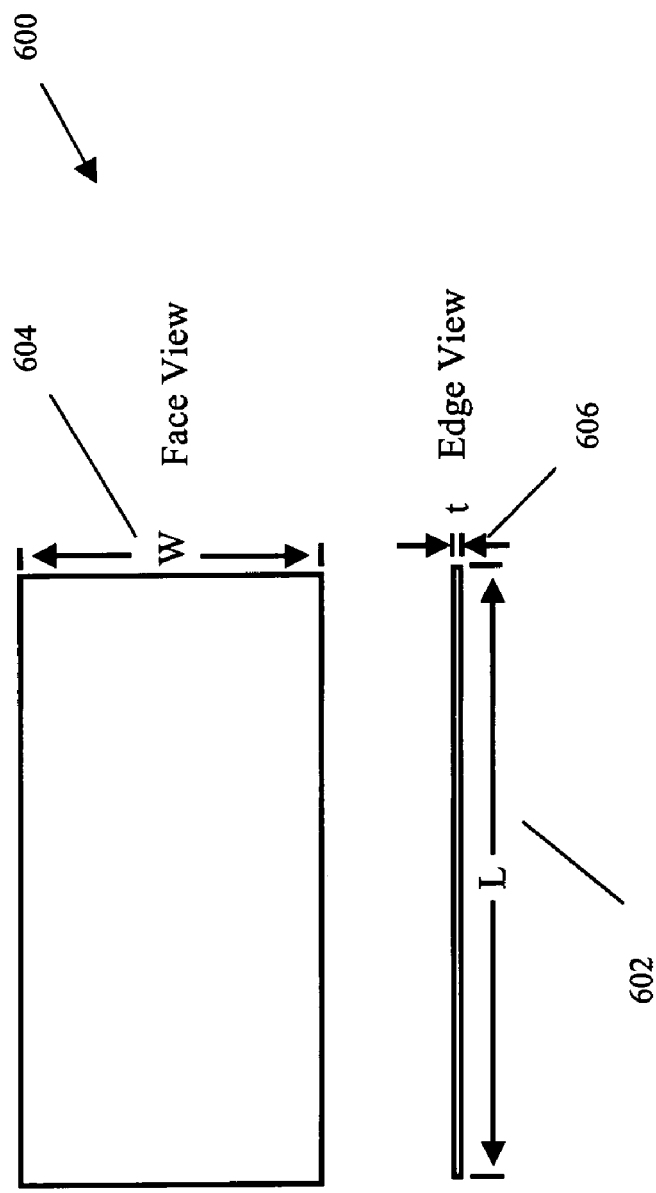
FIG. 6 shows the basic geometry of a planar waveguide appropriate to contain a programmed planar holographic spectral filtering device, according to one embodiment of the invention.

In one embodiment, shown in FIG. 6, a programmed holographic device comprises a thin planar slice of substrate material having millimeter-to-centimeter-scale extent in the x- and y- directions (i.e. length and width dimensions of the planar surface), and a micron-scale extent in the z-direction (i.e. the thickness dimension of 11 the planar slice). The extent 602 in the x-direction is of length L, the extent 604 in the y-direction is of width W, and the extent 606 in the z-direction is of thickness t. Input and output signals propagate within the planar holographic substrate in the x-y plane. The planar holographic substrate, or slab, is typically constructed of a material sufficiently transparent at the intended operational wavelength of the device so that unacceptable loss does not accrue from absorption as signals propagate through the programmed holographic device. Typical substrate materials include silica ($SiO2$), which is transmissive over much of the visible and near infrared spectral region; polymers; and silicon. Many materials capable of supporting volume holograms are known; any of these may be utilized as a substrate material for programmed holographic devices. The thickness of the planar substrate is preferably set to a value small enough to ensure that only a relatively small number of transverse (z) modes are allowed, or more specifically, that allowed transverse (z) modes do not experience significant modal dispersion on passing through the programmed holographic device. Stated another way, the maximal transit-time difference between supported z-modes is preferably substantially less than the temporal resolution that the programmed holographic processor is designed to provide. Yet another description of the preferred thickness is that the inverse of the maximal transit-time difference between supported z-modes is substantially less than the spectral resolution that the programmed holographic reflector is designed to support.

It is also preferable that modal propagation speeds of the planar modes significantly utilized by the device do not change significantly over the operative spatial extent of the programmed holographic structure. Raw substrates are preferably controlled to have refractive index and thickness homogeneity sufficient so that substrate modes accumulate a positional displacement of substantially less than one wavelength of light at the operative frequency, relative to a constant speed reference on passing from end-to-end through the operative programmed holographic structure. Variations in substrate thickness and index of refraction are completely acceptable in those instances where they are known and can be accounted for in the design of the programmed holographic structure.

Figure 7:
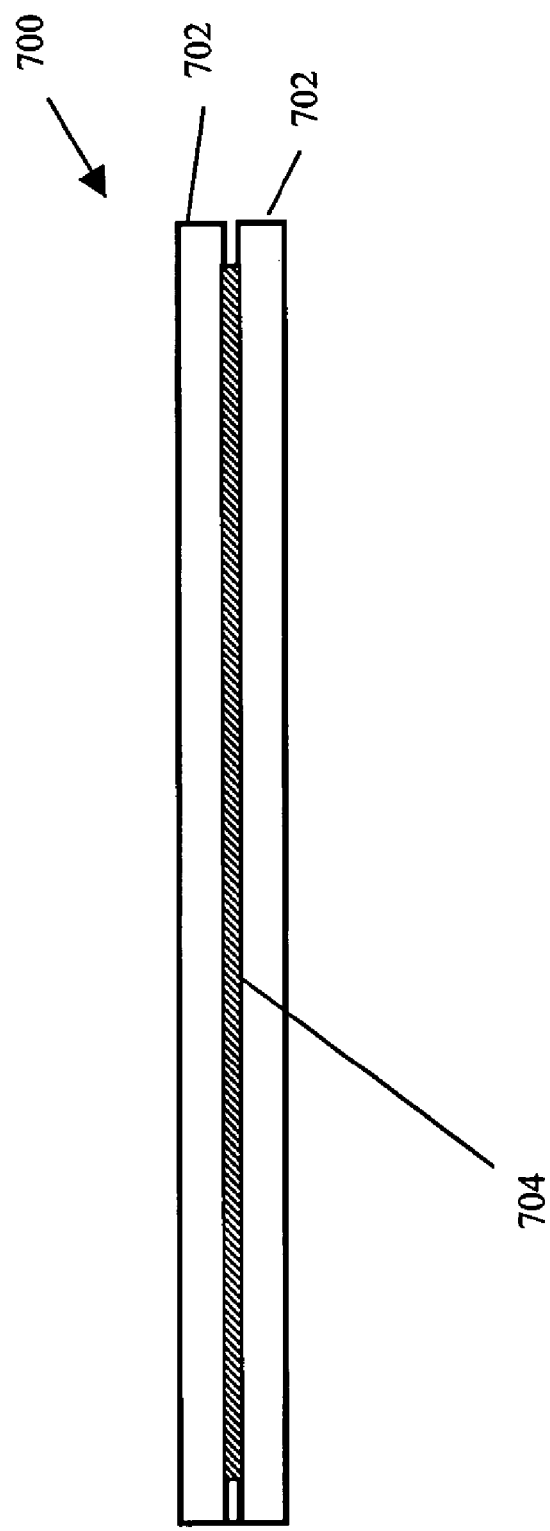
FIG. 7 shows a substrate for a programmed planar holographic spectral filtering device, mounted between support slabs, according to one embodiment of the invention.

Mechanical stability of the planar holographic substrate is typically enhanced when it is attached on one or both sides to support slabs 702, as shown in FIG. 7. Support slabs may be any dielectric whose index of refraction is suitably different from that of the holographic substrate, to ensure that at least one optical mode is primarily confined to propagate within the holographic substrate. Support slabs of metal may also be considered although some absorptive losses will accrue. Optical signals may be coupled into/out of a planar substrate 704 comprising the programmed hologram structure, via integrated optical waveguides or fibers (not shown) coupled to the edge of the substrate, or via prism coupling (not shown) in and/or out along the planar face(s) of the substrate. Waveguide or fiber inputs and outputs coupled to the edge of the substrate may be supported by an attachment strip along portions of the periphery of the planar substrate 704 between the support slabs 702.

The programmed holographic structure comprising the diffracting elements which effects the designed spectral, temporal, and/or spatial filtering, situated on or within the holographic substrate, may be take a variety of embodiments, with corresponding fabrication methods.

The diffractive elements may comprise profile variations in the planar boundary of a planar waveguide. In one embodiment, one or both faces of the substrate, (preferably only one), is etched by photolithographic, e-beam, or other standard surface etching means known in the art, to produce, e.g., a surface depth profile (depth here is defined as the deviation of the local substrate surface from the average surface level), or, e.g., a refractive index profile comprising variations from the original substrate refractive index value, whose spatial structure comprises the diffractive elements of the programmed holographic structure.

In another embodiment, one or both slab faces may be deformed by the application of a stamp or other mechanism, whose surface relief has the spatial structure of the desired programmed holographic structure. In yet another embodiment, a thin deformable dielectric layer, with thickness on the order of one micron, may be deposited on one or both faces of the substrate, followed by deformation of the thin dielectric layer(s) by. e.g., a stamp or other mechanism whose surface relief has the spatial structure of the desired programmed holographic structure. It is to be noted that the similarity in refractive index between the thin dielectric layer and the substrate is important. For a fixed surface relief geometry derived from deformation of an overlayer, the coupling between input and output signals tends to be enhanced when the difference in refractive index of the overlayer and holographic substrate is minimized. More generally, control of the difference in refractive index between overlayer and holographic substrate provides for control over the input-output signal coupling strength.

In yet another embodiment, a metallic or dielectric layer whose surface relief has the spatial structure of the desired programmed holographic structure may be deposited on one or both of the grating slab faces. In yet another embodiment, one or both support slabs whose surface relief has the spatial structure of the desired programmed holographic structure, may be pressed securely against the substrate, and preferably bonded. In yet another embodiment, a planar substrate exhibiting photosensitivity leading to index or absorptive changes, may be exposed to writing optical fields propagating within the substrate and having the characteristics of the design optical fields described below. In yet another embodiment, a planar substrate exhibiting photosensitivity leading to index or absorptive changes, may be exposed, via contact or projection imaging, to an optical writing field whose spatial intensity pattern within the substrate conveys the spatial structure of the desired programmed holographic structure.

Additionally, there exist a large number of methods known in the art for applying approximately periodic structures to the surfaces or interiors of substrate materials, including but not limited to lithography/etch, electron beam lithography, abrasive material removal techniques, laser ablation, photolithography, mechanical ruling, masking, stamping, pressing, and embossing. Use of any of these methods to make volume holograms that apply dielectric perturbations to optical waves propagating within the holographic substrate falls within the scope and spirit of this invention.

Figure 8:
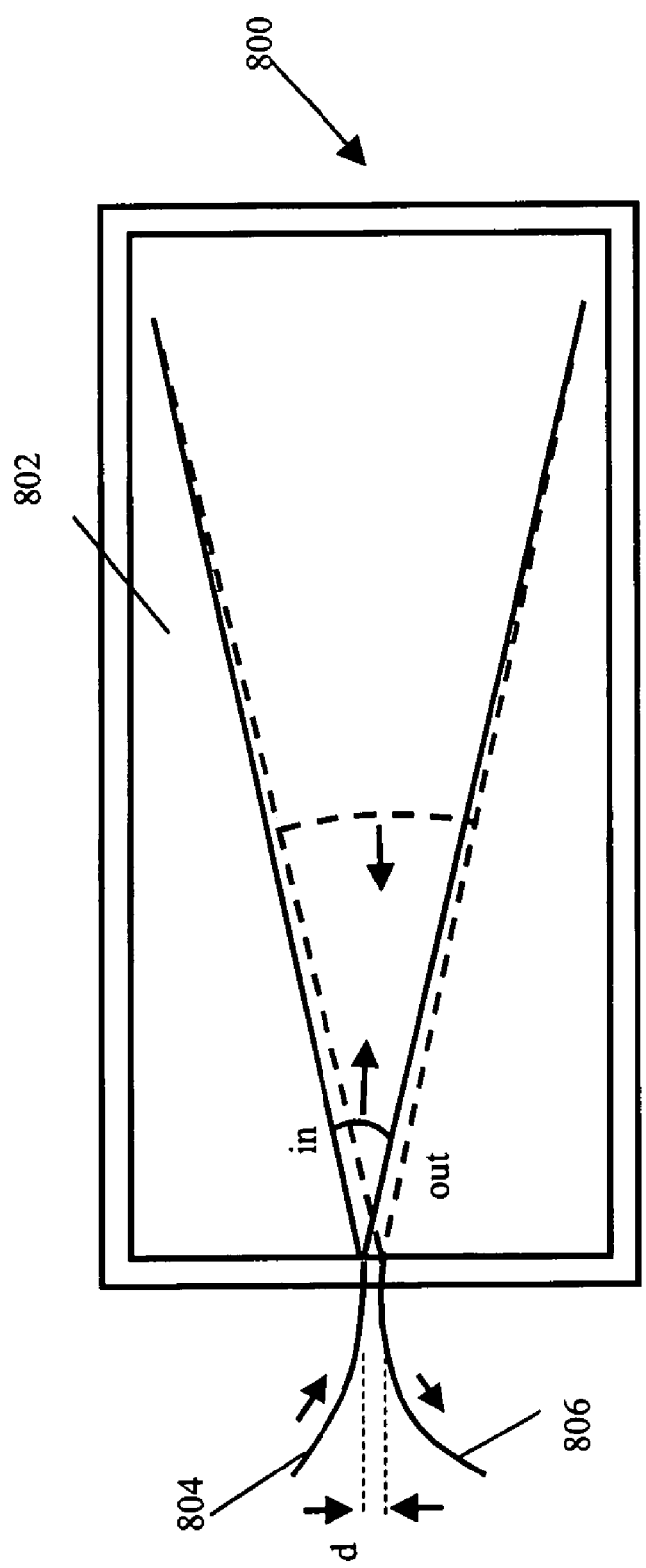
FIG. 8 shows a programmed planar holographic spectral filtering device with one input and one output, according to one embodiment of the invention.
Figure 9A:
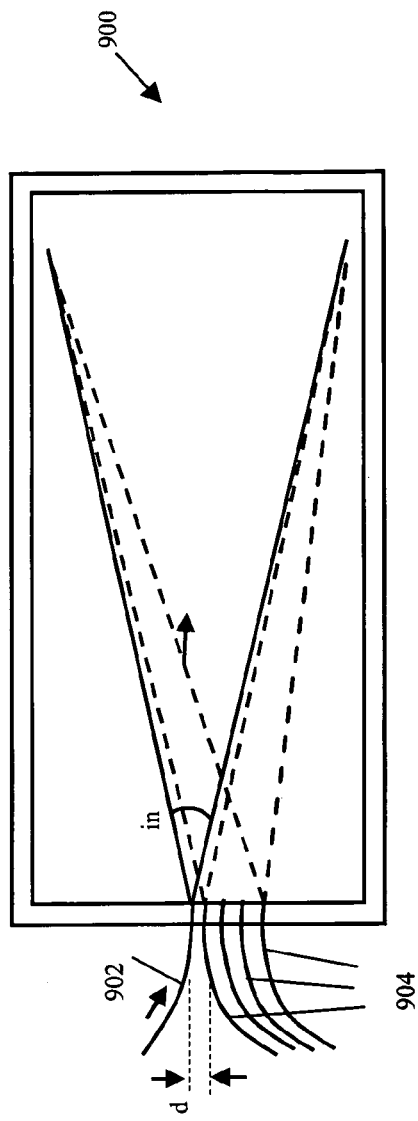
FIG. 9A shows a programmed planar holographic spectral filtering device with one input and multiple outputs, according to an embodiment of the invention.
Figure 9B:
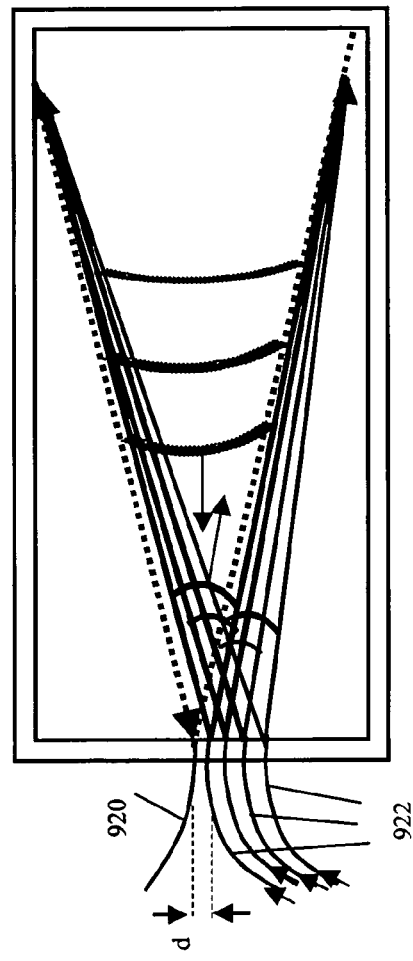
FIG. 9B shows a programmed planar holographic spectral filtering device with multiple inputs, according to an embodiment of the invention.

The programmed holographic structure, written on or within the planar substrate, diffracts the signals incident from one or more input ports to one or more output ports while simultaneously applying a programmed spectral transfer function. FIG. 8 shows an embodiment 800 of a planar programmed holographic processor, 802 with a single input port 804 and a single output port 806. An input optical signal expands from the fiber or waveguide input port 804 as shown. As it propagates, it is diffracted backwards and focused onto the output port 806. The back diffraction process acts further to apply the design spectral transfer function. The spacing between the input and output ports, d, is conveniently made as small as possible, with a typical separation of between about 25 to about 5000 microns. The output port 806 and the input port 804 do not have to be close, but placing them thusly provides for the highest spectral resolution possible for a fixed device length L. For a device length of L, the spectral resolution available with closely spaced input and output ports is roughly $v_s/2L$, where $v_s$ is the speed of light in the utilized z-modes of the holographic substrate. Spectral resolution is degraded by refractive index or thickness variations of the holographic substrate, unless compensated for in the design of the programmed holographic structure. Actual resolution from a device possessing uncompensated refractive index or thickness variations can be estimated by replacing the actual device size L in the formula above with an effective length given by the distance over which actual optical signals within the programmed holographic structure remain coherent with a reference wave that propagates at constant speed. In FIG. 9A a planar programmed holographic structure having an input 902 and multiple outputs 904 is shown. Each of a plurality of signals transmitted from an input 902 (there may be one or more than one signal sent to each output) to outputs 904 experiences a different transfer function. The configuration shown in FIG. 9A may serve as a wavelength-based or temporal-waveform-based demultiplexer; the configuration shown in FIG. 9B, may serve as a multiplexer having inputs 922 and an output 920.

In a programmed holographic device configured as a demultiplexer shown in FIG. 9A, the programmed holographic structure directs one or more specific wavelengths incident from the input port, to each of the output ports. The programmed holographic structure needed to do this comprises the sum of the structures that would individually map only specific wavelengths from the input port to one of the output ports, the holographic structure not appreciably interacting with those wavelengths not directed to that specific output port.

Figure 10:
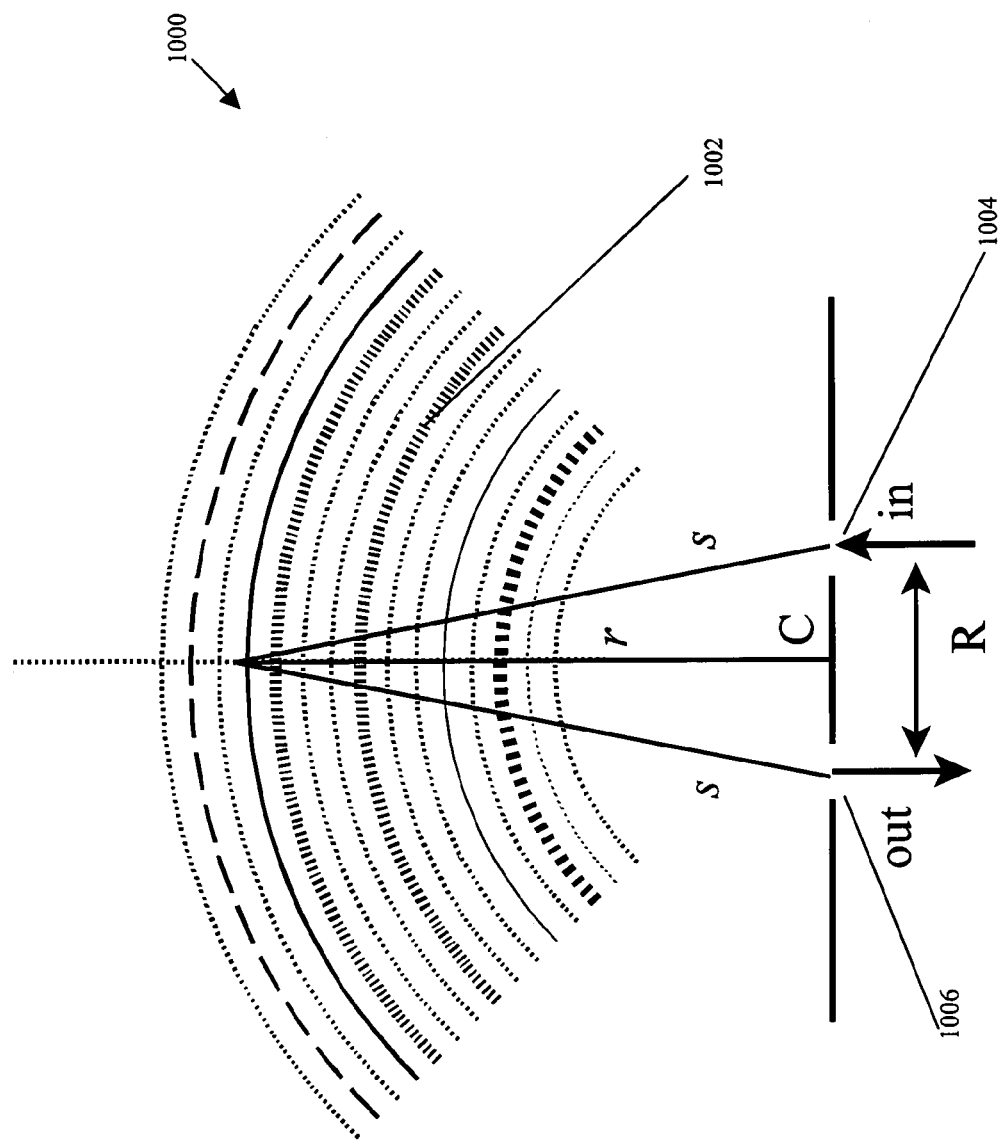
FIG. 10 shows a programmed planar holographic spectral filtering device according to one embodiment of the present invention, indicating the geometry of diffractive elements.

A programmed holographic structure that maps input signals from one input port to one output port is referred to as a primitive programmed holographic structure, or a primitive structure. The overall distributed diffractive (holographic) structure of a device which may map multiple input ports to multiple output ports, and is the sum of one or more primitive structures, is referred to its programmed holographic structure. The primitive programmed holographic structures may occupy spatial regions that are the same, partially overlapping, or non-overlapping. The output ports are typically positioned at respective conjugate image points to the input port. A pair of conjugate image points is defined by the relationship that certain spectral components of a signal emanating from one point are focused by the spatial transfer function of the programmed holographic structure to the conjugate image point; furthermore the two points act reciprocally, so that the same spectral components within a signal emanating from the second point are focused by the transfer function onto the first. Primitive programmed holographic structures comprising diffractive elements in the form of e.g., circular, elliptical, parabolic or other focusing contours, can be employed to produce reciprocal focusing between conjugate points. FIG. 10 shows a set of diffracting elements 1002 which have circular contours, and conjugate points 1004, 1006. Owing to the general wavefront transformation capability of holographic structures, a wide range of input/output geometries can be accommodated. Rather than implementing programmed holographic structures that simply map signals from one point onto another and the reverse, it is possible to configure the programmed holographic structure so as to map an arbitrary input wavefront into an arbitrary output wavefront.

Figure 11:
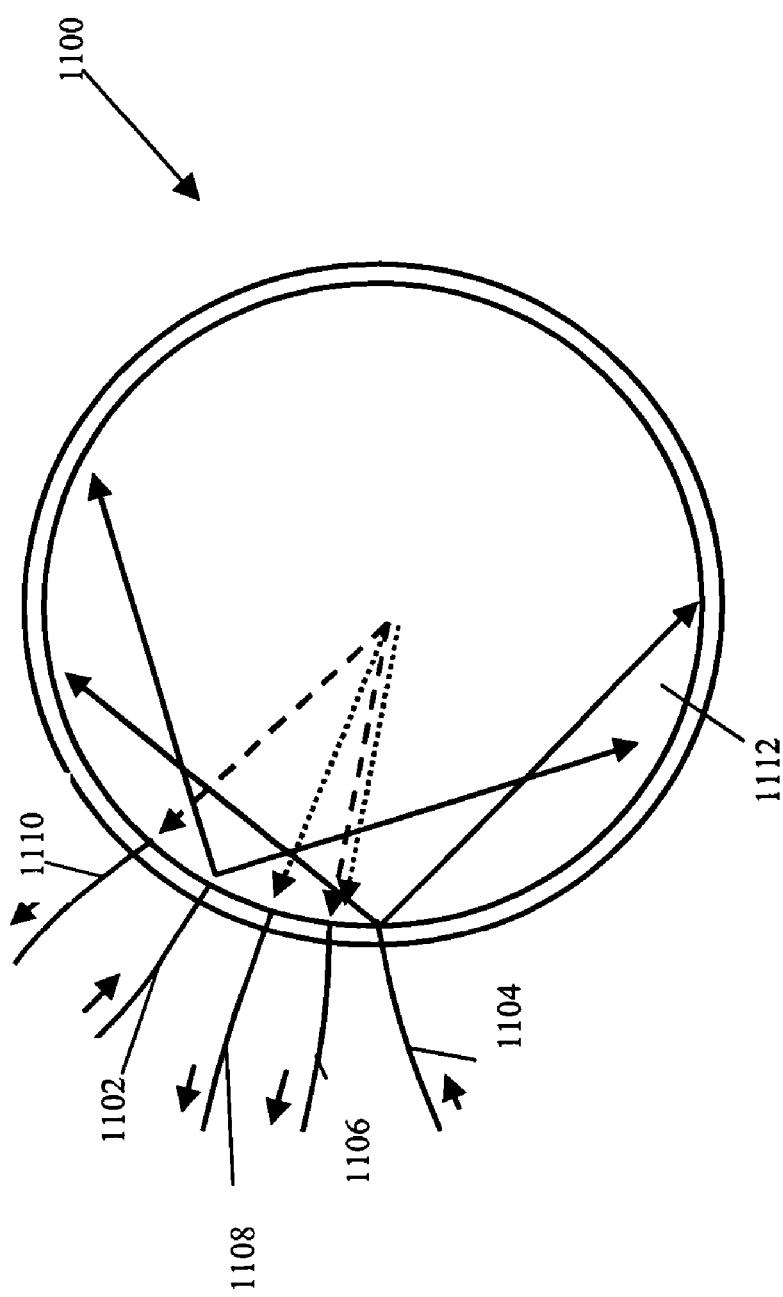
FIG. 11 shows a programmed planar holographic spectral filtering device with multiple inputs and outputs, according to an embodiment of the invention.

In FIG. 11, a planar-programmed holographic device 1100 with a different configuration is shown. In this configuration there are two inputs 1102, 1104, and three outputs 1106, 1108, 1110. The transfer function of the programmed holographic structure 1112 can be designed so that signals from the inputs 1102 and 1104 are directed at one or more of the outputs 1106, 1108, 1110, with each port-to-port connection having an individual spectral/temporal transfer function that may be the same or different than the others. Individual port-to-port connections are controlled by primitive programmed holographic structures.

Figure 12:
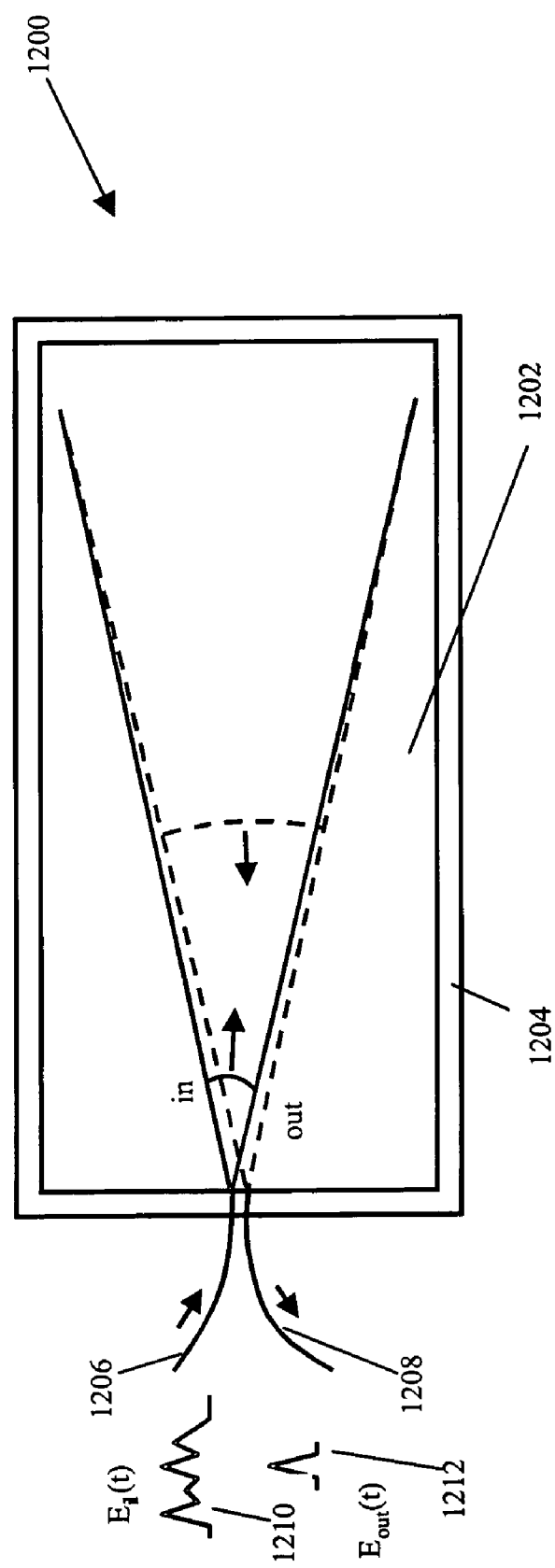
FIG. 12 shows a programmed holographic spectral filtering device configured as an optical waveform cross-correlator, according to one embodiment of the invention.

In FIG. 12, a programmed holographic device 1200 is shown, configured as an optical waveform cross-correlator. A holographic substrate 1202 is mounted to a support slab using an attachment strip 1204. An input fiber 1206 guides an input signal 1210 $E_i(t)$, having Fourier spectrum $E_i(\omega)$, into the holographic substrate to interact with the programmed holographic structure contained therein. An output signal 1212, $E_{out}(t)$ produced by back diffraction from the programmed holographic structure within or on the substrate, is fed into an output fiber 1208. The holographic structure 1200 is programmed so that its spectral transfer function is $E_d^*(\omega)$, where $E_d(\omega)$ is the Fourier transform of a design matching input signal $E_d(t)$. The output signal whose electric field is proportional to the integral, over the frequency $\omega$, of the product $[E_d^*(\omega) \cdot E_i(\omega)]$, represents the cross correlation of $E_i(t)$ with $E_d(t)$.

A primitive programmed holographic reflector/processor comprises a plurality of diffraction elements, each of which typically corresponds to a contour of constant index of refraction, a depth contour of a surface relief, or other physical element known in the art to produce diffracted signals. The spatial structure of the diffractive elements contains the programming information that allows it to map an input port to an output port, with a specific spectral transfer function.

Figure 13:
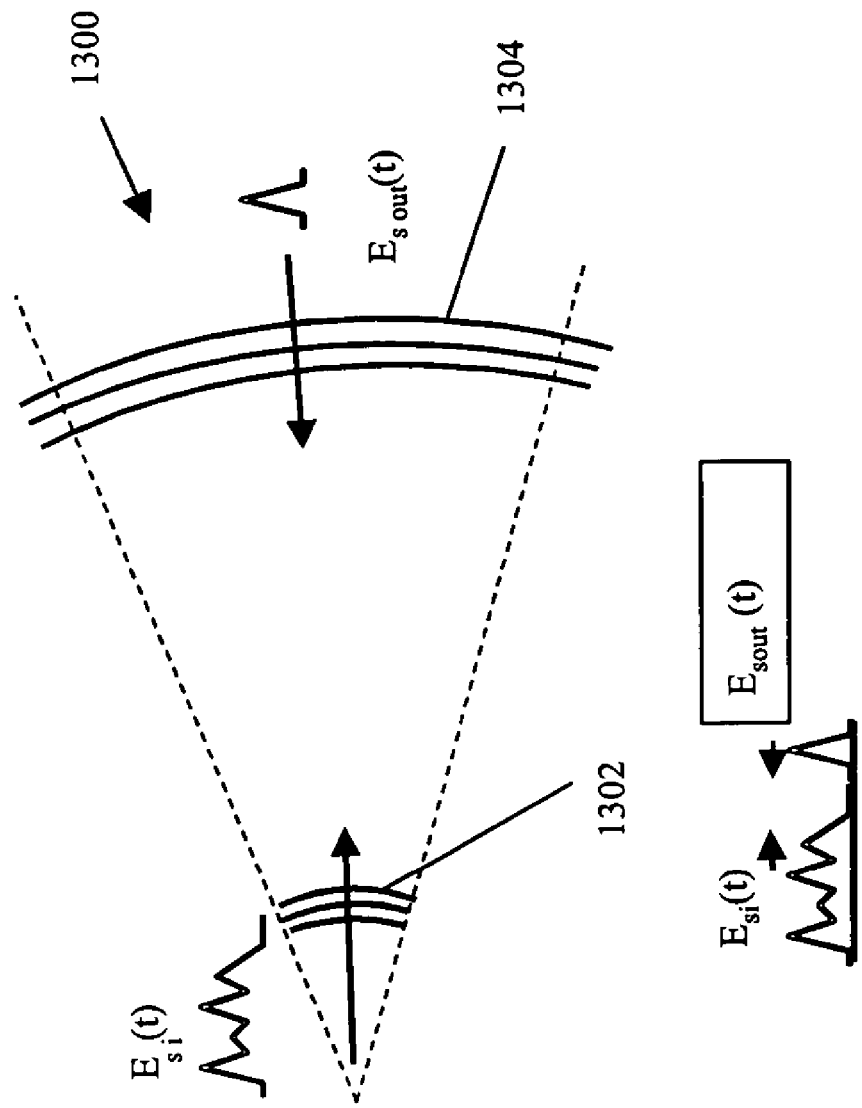
FIG. 13 illustrates a calculational method employing interference between a stimulated input and output signal pulse used in programming according to an aspect of the invention.

The spatial structure of the diffractive elements needed to produce specific spectral transfer functions can be determined in a variety of ways. The spatial structure of a primitive programmed hologram can be calculated as an interference pattern generated by the collision of two optical pulses of appropriate spatial wavefront and temporal profile. As shown in FIG. 13, a simulated input pulse 1302 whose temporal shape is given by $E_{si}(t)$, collides with a simulated output signal pulse 1304 whose temporal shape is given by $E_{sout}(t)$. The calculation models the propagation of the two pulses as they pass through each other, and the electric-field interference pattern that they produce. In one calculational approach, the simulated input pulse is launched from the location of the input port, with a spatial wavefront appropriate to emission from a point source. The simulated output pulse is launched toward the location of the output port so as to completely or partially overlap the path of the simulated input pulse, with a spatial wavefront that provides for aperture-limited, i.e., diffraction-limited, spot size at the location of the output port. The central wavevectors of the simulated input and output pulses make an angle relative to each other. This angle is preferably greater than 90 degrees and more preferably close to 180 degrees. The actual value of the angle is set by the constraints that the simulated pulses at least partially overlap and by the location of the input and output ports. In modeling the propagation of the simulated input and output pulses, variation of field amplitude is preferably suppressed. In the case of planar holographic devices, both simulated pulses propagate in the plane of the planar holographic substrate. In the case of bulk or three-dimensional devices, both pulses propagate through the bulk or three-dimensional substrate. If the primitive holographic structure is to be programmed to produce a spectral transfer function of the form $E_i^*(\omega)$, i.e. the complex conjugate of the Fourier transform of the real temporal function $E_i(t)$, the simulated input pulse is given the temporal waveform $E_i(t)$, i.e. $E_{si}(t)=E_i(t)$, and the temporal waveform of the output pulse, $E_{sout}(t)$, is such that its total temporal duration is substantially shorter than the inverse of the overall spectral bandwidth of $E_i^*(\omega)$; equivalently, the simulated output pulse should have a temporal duration substantially shorter than the inverse of the overall spectral bandwidth of the simulated input pulse. One convenient form for the output temporal profile is a transform-limited brief pulse satisfying the bandwidth constraint cited above. Note that the evolution of the full electric field of each simulated pulse, i.e., carrier frequency plus envelope, is followed through the simulated propagation. The optical carrier frequency of the simulated output signal is made coincident with that of the simulated input signal. The common optical carrier frequency of the two simulated pulses controls the optical frequency at which the primitive programmed holographic structure is operative. The times at which the simulated input and output signals pass through their respective ports are controlled so that the two simulated pulses pass through each other, i.e., collide, while inside the physical boundaries of the holographic substrate. The holographic substrate will optimally have a physical length of at least $V_s\tau_1/2$, where $v_s$ is the speed of light in the substrate and $\tau_1$ is the temporal duration of the simulated input pulse in order to best record the programming structure. The electric field interference pattern calculated as the two simulated pulses collide, is mapped to variations in index of refraction, surface depth, or other parameter as might be appropriate to characterize the specific type of diffractive elements employed in the hologram design. To create a general transfer function $T(\omega)$, the calculation method described above is implemented with an simulated input signal having the spectrum $T^*(\omega)$ with the simulated output pulse chosen as above. The temporal profile of the general simulated input pulse is derived from $T^*(\omega)$ by Fourier transformation.

It may be useful to note that the impulse response, i.e., the temporal output waveform produced in response to a temporal delta function injected into the input port, of a primitive programmed holographic structure designed according to the method disclosed supra, is $E_i(-t)$, i.e. the time-reverse of the simulated input pulse.

As an alternative to the calculational procedure outlined above, the temporal waveforms of the simulated input and output pulses called out above may be interchanged. In this case, the spectral transformation produced by a primitive holographic structure programmed according to the calculated interference pattern will be $E_i(\omega)$, and the impulse response will be $E_i(t)$.

The wavefronts of the simulated input and output functions can be modified from the forms specified above to provide more efficient coupling of input signals to the output port employed. Let $E_{ir}(r)$, $E_{outr}(r)$, $E_{si}(r)$, and $E_{sout}(r)$ be, respectively, the spatial wave generated by the input port, the spatial wave optimally matched to the output port, the spatial wave used as the simulated input, and the spatial wave used as the simulated output. The parameter r represents the vector position within the holographic substrate. $E_{ir}(r)$ and $E_{outr}(r)$ are fixed by the port characteristics and the waveguide or medium to which they couple. The functions $E_{si}(r)$ and $E_{sout}(r)$ are preferably chosen so that the following equation is satisfied:

$$E_{outr}(r) = E_{ir}(r) \cdot E_{si}^*(r) \cdot E_{sout}(r).$$

There are multiple calculational methods known in the art for designing the spectral transfer functions of fiber Bragg gratings. These methods can be applied to the design of programmed holographic structures of the present invention, by taking appropriate slices perpendicular to the diffractive elements, and approximating the design problem as having a single dimension. This approach will be most useful when input and output ports are closely spaced.

Programmed holographic structures capable of providing multiple port-to-port mappings are calculated as the sum of multiple primitive programmed holographic structures, each of which supports a single port-to-port mapping. As stated above, the primitive structures may be entirely overlapping, partially overlapping, or non-overlapping within the holographic substrate.

If the programmed holographic structures are to be fabricated by direct optical exposure of photosensitive holographic substrates, as in traditional holographic practice, the simulated signals described in the calculation method above correspond to the writing pulses needed. Writing may require large numbers of identical exposures, and may require full interferometric stability.

An important factor in the implementation of programmed holographic processors is the stabilization of their properties relative to changes in ambient temperature. The higher the spectral resolution demanded of programmed holographic devices, the greater will be the challenge of packaging them with adequate thermal stability. This is a common problem in optical devices wherein spectral response derives from physical structure. Great strides in thermal compensation have been made in the case of thin film and fiber grating devices. Many of those same compensation/stabilization methods can be applied to programmed holographic spectral filtering devices. Alternatively, simple reference diffractive structures can be designed into the devices, whose output provides a feedback key for active stabilization of the devices to the frequencies of input optical signals, or to reference optical signals.

Having illustrated and described the principles of the invention in the above-described embodiments, it should be apparent to those skilled in the art that the embodiments can be modified in arrangement and detail without departing from such principles. In view of the many possible embodiments to which the presented may be applied, it should be recognized that the illustrated embodiments are only examples of the invention and should not be taken as a limitation on the scope of the invention. Rather, the invention is defined by the following claims. It is therefore claimed as the invention all such embodiments that come within the scope and spirit of these claims.

For purposes of the present disclosure and appended claims, the conjunction "or" is to be construed inclusively (e.g., "a dog or a cat" would be interpreted as "a dog, or a cat, or both"; e.g., "a dog, a cat, or a mouse" would be interpreted as "a dog, or a cat, or a mouse, or any two, or all three"), unless: i) it is explicitly stated otherwise, e.g., by use of "either . . . or", "only one of . . . ", or similar language; or ii) two or more of the listed alternatives are mutually exclusive within the particular context, in which case "or" would encompass only those combinations involving non-mutually-exclusive alternatives.

What is claimed is:

1. An optical apparatus, comprising:
   a substrate that propagates optical signals in at least two spatial dimensions, the substrate having a first port and a second port; and
   a plurality of diffractive elements collectively arranged within the substrate so as to exhibit a positional variation in amplitude, optical separation, or spatial phase over some portion of the substrate,
   wherein:
   each element of the plurality of diffractive elements is individually contoured and positioned so as to preferentially route a portion of an optical signal between the first and second optical ports as the optical signal propagates within the substrate;
   when a first optical signal having a first spatial wavefront and a first optical spectrum is introduced through the first port, the plurality of diffractive elements i) collectively applies a transfer function to the first optical signal to produce a second optical signal having a second spatial wavefront and a second optical spectrum, and ii) routes the second optical signal through the second port;

the first spatial wavefront differs from the second spatial wavefront; and the second optical spectrum comprises the first optical spectrum multiplied by a spectral portion of the transfer function, the spectral portion of the transfer function being determined at least in part by said positional variation in amplitude, optical separation, or spatial phase exhibited by the plurality of diffractive elements.

2. The apparatus of claim 1, further comprising:

an input optical waveguide for introducing an input optical signal into the substrate through the first port; or an output optical waveguide for receiving an output optical signal exiting the substrate through the second port.

3. The apparatus of claim 1, wherein the substrate propagates optical signals in three spatial dimensions.

4. The apparatus of claim 1, wherein the substrate comprises a slab optical waveguide that propagates optical signals in two spatial dimensions.

5. The apparatus of claim 1, wherein each of the diffractive elements has a substantially spherical or substantially circular contour and a corresponding center of curvature.

6. The apparatus of claim 5, wherein the centers of curvature of the contours of the plurality of diffractive elements are substantially coincident, and further comprising an input waveguide and an output waveguide, wherein the input optical signal originates from the input waveguide and the output optical signal is routed to the output waveguide by the plurality of diffractive elements, with the respective input and output waveguides located at respective conjugate image points of the plurality of the diffractive elements whose centers of curvature are substantially coincident.

7. The apparatus of claim 1, wherein a propagation direction of the input optical signal and a propagation direction of the output optical signal are non-collinear.

8. The apparatus of claim 1, wherein the input optical signal comprises an optical pulse.

9. The apparatus of claim 1, wherein the transfer function comprises a spectral transfer function programmed in the plurality of diffractive elements, the spectral transfer function comprising a conjugate Fourier transform $E^*(\omega)$ of a design temporal waveform $E(t)$.

10. The apparatus of claim 1, wherein each portion of the first spatial wavefront contributes to the second optical signal.

11. The apparatus of claim 1, wherein the substrate resides within a planar optical waveguide, the first optical signal interacting with the plurality of diffractive elements while propagating within the planar waveguide, propagation of the first and second optical signals within the planar waveguide being substantially guided in at least one dimension by the planar waveguide.

12. The apparatus of claim 11, further comprising:

an input channel waveguide positioned to introduce the first optical signal into an edge of the planar waveguide through the first port; or an output channel waveguide positioned to receive the second optical signal output from an edge of the planar waveguide through the second port.

13. The apparatus of claim 1, further comprising:

a third port; and a second plurality of diffractive elements collectively arranged within the substrate so as to exhibit a positional variation in amplitude, optical separation, or spatial phase over some portion of the substrate, wherein:

each element of the second plurality of diffractive elements is individually contoured and positioned so as to preferentially route a portion of an optical signal between the first and third optical ports as the optical signal propagates within the substrate;

when the first optical signal having the first spatial wavefront and the first optical spectrum is introduced through the first port, the second plurality of diffractive elements i) collectively applies a second transfer function to the first optical signal to produce a third optical signal having a third spatial wavefront and a third optical spectrum, and ii) routes the third optical signal through the third port;

the first spatial wavefront differs from the third spatial wavefront; and the third optical spectrum comprises the first optical spectrum multiplied by a spectral portion of the second transfer function, the spectral portion of the second transfer function being determined at least in part by said positional variation in amplitude, optical separation, or spatial phase exhibited by the second plurality of diffractive elements.

14. The apparatus of claim 13, wherein the substrate resides within a planar optical waveguide, the first optical signal interacting with the pluralities of diffractive elements while propagating within the planar waveguide, propagation of the first, second, or third optical signals within the planar waveguide being substantially guided in at least one dimension by the planar waveguide.

15. The apparatus of claim 13, further comprising:

a channel waveguide positioned to introduce the first optical signal into an edge of the planar waveguide through the first port;

a channel waveguide positioned to receive the second optical signal from the edge of the planar waveguide through the second port; or a channel waveguide positioned to receive the third optical signal from the edge of the planar waveguide through the third port.

16. The apparatus of claim 1, further comprising:

a third port; and a second plurality of diffractive elements collectively arranged within the substrate so as to exhibit a positional variation in amplitude, optical separation, or spatial phase over some portion of the substrate, wherein:

each element of the second plurality of diffractive elements is individually contoured and positioned so as to preferentially route a portion of an optical signal between the second and third optical ports as the optical signal propagates within the substrate;

when a third optical signal having a third spatial wavefront and a third optical spectrum is introduced through the third port, the second plurality of diffractive elements i) collectively applies a second transfer function to the third optical signal to produce a fourth optical signal having a fourth spatial wavefront and a fourth optical spectrum, and ii) routes the fourth optical signal through the second port;

the third spatial wavefront differs from the fourth spatial wavefront; and the fourth optical spectrum comprises the third optical spectrum multiplied by a spectral portion of the second transfer function, the spectral portion of the second transfer function being determined at least in part by said positional variation in amplitude, optical separation, or spatial phase exhibited by the second plurality of diffractive elements.

17. The apparatus of claim 16, wherein the substrate resides within a planar optical waveguide, the first optical signal interacting with the plurality of diffractive elements while propagating within the planar waveguide, the third optical signal interacting with the second plurality of diffractive elements while propagating within the planar waveguide, propagation of the first, second, third, or fourth optical signals within the planar waveguide being substantially guided in at least one dimension by the planar waveguide.

18. The apparatus of claim 16, further comprising:
a channel waveguide positioned to introduce the first optical signal into an edge of the planar waveguide through the first port;
a channel waveguide positioned to receive the second optical signal or the fourth optical signal from the edge of the planar waveguide through the second port; or
a channel waveguide positioned to introduce the third optical signal into the edge of the planar waveguide through the third port.

19. A method comprising:
receiving a first optical signal through a first port of an optical device, the first optical signal having a first optical spectrum and a first spatial wavefront;
diffracting the first optical signal via a plurality of diffractive elements within the optical device and thereby producing a second optical signal having a second optical spectrum and a second spatial wavefront and routing the second optical signal through a second port, wherein:
the plurality of diffractive elements is collectively arranged within the device so as to exhibit a positional variation in amplitude, optical separation, or spatial phase over some portion of the device;
each element of the plurality of diffractive elements is individually contoured and positioned so as to preferentially route a portion of an optical signal between the first port and the second port as the optical signal propagates within the optical device;
the plurality of diffractive elements collectively applies a transfer function to the first optical signal to produce the second optical signal;
the first spatial wavefront differs from the second spatial wavefront; and
the second optical spectrum comprises the first optical spectrum multiplied by a spectral portion of the transfer function, the spectral portion of the transfer function being determined at least in part by said positional variation in amplitude, optical separation, or spatial phase exhibited by the plurality of diffractive elements.

20. The method of claim 19, wherein the optical device further comprises:
an input optical waveguide for introducing an input optical signal into the optical device through the first port; or
an output optical waveguide for receiving an output optical signal exiting the optical device through the second port.

21. The method of claim 19, wherein the optical device propagates optical signals in three spatial dimensions.

22. The method of claim 19, wherein the optical device comprises a slab optical waveguide that propagates optical signals in two spatial dimensions.

23. The method of claim 19, wherein each of the diffractive elements has a substantially spherical or substantially circular contour and a corresponding center of curvature.

24. The method of claim 23, wherein the centers of curvature of the contours of the plurality of diffractive elements are substantially coincident, and the optical device further comprises an input waveguide and an output waveguide, wherein the input optical signal originates from the input waveguide and the output optical signal is routed to the output waveguide by the plurality of diffractive elements, with the respective input and output waveguides located at respective conjugate image points of the plurality of the diffractive elements whose centers of curvature are substantially coincident.

25. The method of claim 19, wherein a propagation direction of the input optical signal and a propagation direction of the output optical signal are non-collinear.

26. The method of claim 19, wherein the input optical signal comprises an optical pulse.

27. The method of claim 19, wherein the transfer function comprises a spectral transfer function programmed in the plurality of diffractive elements, the spectral transfer function comprising a conjugate Fourier transform $E^*(\omega)$ of a design temporal waveform $E(t)$.

28. The method of claim 19, wherein each portion of the first spatial wavefront contributes to the second optical signal.

29. The method of claim 19, wherein the optical device comprises a planar optical waveguide, the first optical signal interacting with the plurality of diffractive elements while propagating within the planar waveguide, propagation of the first and second optical signals within the planar waveguide being substantially guided in at least one dimension by the planar waveguide.

30. The method of claim 29, wherein the optical device further comprises:
an input channel waveguide positioned to introduce the first optical signal into an edge of the planar waveguide through the first port; or
an output channel waveguide positioned to receive the second optical signal output from an edge of the planar waveguide through the second port.

31. The method of claim 19, further comprising diffracting the first optical signal via a second plurality of diffractive elements within the optical device and thereby producing a third optical signal having a third optical spectrum and a third spatial wavefront and routing the third optical signal through a third port, wherein:
the second plurality of diffractive elements is collectively arranged within the device so as to exhibit a positional variation in amplitude, optical separation, or spatial phase over some portion of the device;
each element of the second plurality of diffractive elements is individually contoured and positioned so as to preferentially route a portion of an optical signal between the first and third optical ports as the optical signal propagates within the substrate; and
the second plurality of diffractive elements collectively applies a second transfer function to the first optical signal to produce the third optical signal;
the first spatial wavefront differs from the third spatial wavefront; and
the third optical spectrum comprises the first optical spectrum multiplied by a spectral portion of the second transfer function, the spectral portion of the second transfer function being determined at least in part by said positional variation in amplitude, optical separation, or spatial phase exhibited by the second plurality of diffractive elements.

32. The method of claim 31, wherein the optical device comprises a planar optical waveguide, the first optical signal interacting with the pluralities of diffractive elements while propagating within the planar waveguide, propagation of the first, second, and third optical signals within the planar waveguide being substantially guided in at least one dimension by the planar waveguide.

33. The method of claim 31, wherein the optical device further comprises:
a channel waveguide positioned to introduce the first optical signal into an edge of the planar waveguide through the first port;
a channel waveguide positioned to receive the second optical signal from the edge of the planar waveguide through the second port; or
a channel waveguide positioned to receive the third optical signal from the edge of the planar waveguide through the third port.

34. The method of claim 19, further comprising:
receiving a third optical signal at a third port of the optical device, the third optical signal having a third optical spectrum and a third spatial wavefront; and
diffracting the third optical signal via a second plurality of diffractive elements within the optical device and thereby producing a fourth optical signal having a fourth optical spectrum and a fourth spatial wavefront and routing the fourth optical signal through the second port,
wherein:
the second plurality of diffractive elements is collectively arranged within the device so as to exhibit a positional variation in amplitude, optical separation, or spatial phase over some portion of the device;
each element of the second plurality of diffractive elements is individually contoured and positioned so as to preferentially route a portion of an optical signal between the second and third optical ports as the optical signal propagates within the substrate;
the second plurality of diffractive elements collectively applies a second transfer function to the third optical signal to produce the fourth optical signal;
the third spatial wavefront differs from the fourth spatial wavefront; and
the fourth optical spectrum comprises the third optical spectrum multiplied by a spectral portion of the second transfer function, the spectral portion of the second transfer function being determined at least in part by said positional variation in amplitude, optical separation, or spatial phase exhibited by the second plurality of diffractive elements.

35. The method of claim 34, wherein the optical device comprises a planar optical waveguide, the first optical signal interacting with the plurality of diffractive elements while propagating within the planar waveguide, the third optical signal interacting with the second plurality of diffractive elements while propagating within the planar waveguide, propagation of the first, second, third, and fourth optical signals within the planar waveguide being substantially guided in at least one dimension by the planar waveguide.

36. The method of claim 34, wherein the optical device further comprises:
a channel waveguide positioned to introduce the first optical signal into an edge of the planar waveguide through the first port;
a channel waveguide positioned to receive the second optical signal or the fourth optical signal from the edge of the planar waveguide through the second port; or
a channel waveguide positioned to introduce the third optical signal into the edge of the planar waveguide through the third port.

37. An optical apparatus, comprising:
a substrate that propagates optical signals in at least two spatial dimensions;
a plurality of diffractive elements collectively arranged within the substrate so as to exhibit a positional variation in amplitude, optical separation, or spatial phase over some portion of the substrate;
an input port for launching toward the plurality of diffractive elements an input optical signal having an input spatial wavefront and an input optical spectrum; and
a plurality of output ports each for receiving and transmitting a corresponding one of a plurality of output optical signals,
wherein:
each element of the plurality of diffractive elements is individually contoured and positioned so as to preferentially route a portion of an optical signal between the input port and one of the output ports as the optical signal propagates within the substrate;
when the input optical signal is launched through the input port, the plurality of diffractive elements i) collectively applies a plurality of corresponding transfer functions to the input optical signal to produce the plurality of output optical signals having corresponding output spatial wavefronts and corresponding output optical spectra, and ii) routes the output optical signals through the corresponding output ports;
the input spatial wavefront differs from at least one of the output spatial wavefronts; and
at least one output optical spectrum comprises the input optical spectrum multiplied by a corresponding spectral portion of the transfer function, the corresponding spectral portion of the transfer function being determined at least in part by said positional variation in amplitude, optical separation, or spatial phase exhibited by the plurality of diffractive elements.

38. The apparatus of claim 37, wherein:
the input optical signal comprises a plurality of wavelength-differentiated communication channels; and
at least one output optical signal i) comprises fewer than all of the plurality of wavelength-differentiated communication channels that comprise the input optical signal, and ii) differs in propagation direction from the other output optical signals.

39. The apparatus of claim 37, wherein:
the input optical signal comprises a plurality of wavelength-differentiated communication channels; and
each output optical signal i) comprises a single channel of the plurality of wavelength-differentiated communication channels that comprise the input optical signal, and ii) differs in propagation direction from each of the other output optical signals.

40. The apparatus of claim 37, wherein at least one output optical signal comprises more than one of the wavelength-differentiated communications channels.

41. The apparatus of claim 37, wherein the substrate resides within a planar optical waveguide, the input optical signal interacting with the plurality of diffractive elements while propagating within the planar waveguide, propagation of the input and output optical signals within the planar waveguide being substantially guided in at least one dimension by the planar waveguide, and further comprising:
- an input channel waveguide positioned to introduce the input optical signal into an edge of the planar waveguide through the input port; and
- a plurality of output channel waveguides each positioned to receive a corresponding output optical signal from the edge of the planar waveguide through the corresponding output port.

42. An optical apparatus, comprising:
- a substrate that propagates optical signals in at least two spatial dimensions;
- a plurality of diffractive elements collectively arranged within the substrate so as to exhibit a positional variation in amplitude, optical separation, or spatial phase over some portion of the substrate;
- a plurality of input ports for launching toward the plurality of diffractive elements corresponding input optical signals having corresponding input spatial wavefronts and corresponding input optical spectra; and
- an output port for receiving and transmitting an output optical signal, wherein:
- each element of the plurality of diffractive elements is individually contoured and positioned so as to preferentially route a portion of an optical signal between one of the input ports and the output port as the optical signal propagates within the substrate;
- when the input optical signals are launched through the corresponding input ports, the plurality of diffractive elements i) collectively applies a plurality of corresponding transfer functions to the input optical signals to produce the output optical signal having an output spatial wavefront and an output optical spectrum, and ii) routes the output optical signal through the output port;
- at least one of the input spatial wavefronts differs from the output spatial wavefront; and
- the output optical spectrum comprises at least one of the input optical spectra multiplied by a spectral portion of the transfer function, the spectral portion of the transfer function being determined at least in part by said positional variation in amplitude, optical separation, or spatial phase exhibited by the plurality of diffractive elements.

43. The apparatus of claim 42, wherein:
- the output optical signal comprises a plurality of wavelength-differentiated communication channels; and
- at least one input optical signal i) comprises fewer than all of the plurality of wavelength-differentiated communication channels that comprise the output optical signal, and ii) differs in propagation direction from the other input optical signals.

44. The apparatus of claim 42, wherein:
- the output optical signal comprises a plurality of wavelength-differentiated communication channels; and
- each input optical signal i) comprises a single channel of the plurality of wavelength-differentiated communication channels that comprise the output optical signal, and ii) differs in propagation direction from each of the other input optical signals.

45. The apparatus of claim 42, wherein at least one input optical signal comprises more than one of the wavelength-differentiated communications channels.

46. The apparatus of claim 42, wherein the substrate resides within a planar optical waveguide, the input optical signals interacting with the plurality of diffractive elements while propagating within the planar waveguide, propagation of the input and output optical signals within the planar waveguide being substantially guided in at least one dimension by the planar waveguide, and further comprising:
- a plurality of input channel waveguides positioned to introduce the corresponding input optical signals into an edge of the planar waveguide through the input port; and
- an output channel waveguide positioned to receive the output optical signal from the edge of the planar waveguide through the output port.

47. The apparatus of claim 1, wherein the first optical spectrum differs from the second optical spectrum.

48. The apparatus of claim 13, wherein the first optical spectrum differs from the third optical spectrum.

49. The apparatus of claim 13, wherein the apparatus functions as a demultiplexer.

50. The apparatus of claim 16, wherein the third optical spectrum differs from the fourth optical spectrum.

51. The apparatus of claim 16, wherein the apparatus functions as a multiplexer.

52. The apparatus of claim 19, wherein the first optical spectrum differs from the second optical spectrum.

53. The apparatus of claim 31, wherein the first optical spectrum differs from the third optical spectrum.

54. The apparatus of claim 31, wherein the device functions as a demultiplexer.

55. The apparatus of claim 34, wherein the third optical spectrum differs from the fourth optical spectrum.

56. The apparatus of claim 34, wherein the device functions as a multiplexer.

57. The apparatus of claim 37, wherein the input optical spectrum differs from at least one of the output optical spectra.

58. The apparatus of claim 37, wherein the device functions as a demultiplexer.

59. The apparatus of claim 42, wherein at least one of the input optical spectra differs from the output optical spectrum.

60. The apparatus of claim 42, wherein the device functions as a multiplexer.

* * * * *